United States Patent
Carter et al.

(10) Patent No.: US 11,111,329 B2
(45) Date of Patent: Sep. 7, 2021

(54) PREPARATION OF AN AQUEOUS DISPERSION OF COPOLYMER PARTICLES OF VINYL ACETATE AND A CYCLIC KETENE ACETAL MONOMER

(71) Applicant: Rohm and Haas Company, Collegeville, PA (US)

(72) Inventors: Matthew Carter, Bala Cynwyd, PA (US); Ralph C. Even, Blue Bell, PA (US); Andrew Hejl, Lansdale, PA (US)

(73) Assignee: Rohm and Haas Company, Collegeville, PA (US)

( * ) Notice: Subject to any disclaimer, the term of this patent is extended or adjusted under 35 U.S.C. 154(b) by 0 days.

(21) Appl. No.: 16/822,292

(22) Filed: Mar. 18, 2020

(65) Prior Publication Data

US 2020/0325261 A1   Oct. 15, 2020

Related U.S. Application Data

(60) Provisional application No. 62/831,868, filed on Apr. 10, 2019.

(51) Int. Cl.
*C08F 218/08* (2006.01)
*C08L 31/04* (2006.01)

(52) U.S. Cl.
CPC ............ *C08F 218/08* (2013.01); *C08L 31/04* (2013.01); *C08F 2800/20* (2013.01)

(58) Field of Classification Search
CPC ..... C08F 218/08; C08F 2800/20; C08L 31/04
USPC ........................................................ 526/286
See application file for complete search history.

(56) References Cited

U.S. PATENT DOCUMENTS

| | | | | |
|---|---|---|---|---|
| 3,714,098 A | * | 1/1973 | Rauterkus | C08F 2/30 524/459 |
| 4,812,510 A | * | 3/1989 | Barnett | C08F 18/08 524/807 |
| 4,959,428 A | * | 9/1990 | Abe | C08F 2/26 525/293 |
| 5,541,275 A | * | 7/1996 | Fleischmann | D06M 15/333 526/266 |
| 2010/0330286 A1 | * | 12/2010 | Wu | C08F 220/18 427/385.5 |

OTHER PUBLICATIONS

Agarwal, "Synthesis of Degradable Materials Based on Caprolactoneand Vinyl Acetate Units Using Radical Chemistry., Polymer Journal, 2009, pp. 650-660, vol. 41".
Bell, Controlling the synthesis of degradable vinyl polymers by xanthate-mediated polymerization, Polymer Chemistry, 2015, pp. 7447-7454, vol. 6.
Undin, "Random introduction of degradable linkages into functional vinyl polymers byradical ring-opening polymerization, tailored for soft tissue engineering, Polymer Chemistry, 2012, pp. 1260-1266, vol. 3".

\* cited by examiner

*Primary Examiner* — Michael M. Bernshteyn
(74) *Attorney, Agent, or Firm* — Reid S. Willis

(57) ABSTRACT

The present invention relates to a method comprising the steps of a) contacting under emulsion polymerization conditions vinyl acetate; a cyclic ketene acetal monomer; and a monoethylenically unsaturated acid monomer or a salt thereof; to form an aqueous dispersion of copolymer particles comprising structural units of vinyl acetate, the cyclic ketene acetal, and the monoethylenically unsaturated acid monomer or a salt thereof; wherein the cyclic ketene acetal monomer is characterized by following structure:

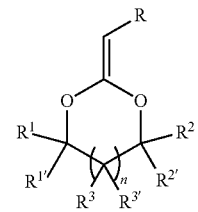

where n and the R groups are as defined herein. The method of the present invention provides a water-borne dispersion that is substantially free of volatile organic solvents and that provides a readily degradable polymer that is useful, for example, in the manufacture of biodegradable packaging products.

10 Claims, No Drawings

PREPARATION OF AN AQUEOUS DISPERSION OF COPOLYMER PARTICLES OF VINYL ACETATE AND A CYCLIC KETENE ACETAL MONOMER

BACKGROUND OF THE INVENTION

The present invention relates to the preparation of an aqueous dispersion of polymer particles comprising structural units of vinyl acetate and a cyclic ketene acetal monomer.

Copolymers of vinyl acetate (VA) and a cyclic ketene acetal (CKA) monomer such as 2-methylene-1,3-dioxepane (MDO) are particularly useful in applications that require polymer backbone degradation, such as degradable packaging, or the physical erosion of polymer-based thin films and surface coatings. These copolymers are described as being prepared in the presence of an organic solvent as disclosed, for example, in *Polym. J.* 2009, 41, 650-660; *Polym. Chem.* 2012, 3, 1260-1266; *Polym. Chem.* 2015, 6, 7447-7454; and US 1996/5541275.

Organic solvents are used to prepare CKA-containing polymers because CKAs are known to be hydrolytically unstable. For example, MDO hydrolyzes in water to form 4-hydroxybutyl acetate, thereby reducing the efficiency of incorporation of structural units of MDO into the copolymer backbone. Accordingly, the hydrolytic instability of MDO mandates the use of unreactive organic solvents; unfortunately, these solvents are undesirable due to their high cost, the cost associated with their removal, recovery, and recycling, and their contribution to remnant volatile organic solvents in the final isolated product.

Accordingly, it would be advantageous to find a way to prepare aqueous based VA-CKA copolymers in a way that significantly reduces the formation of unwanted hydrolytic byproducts.

SUMMARY OF THE INVENTION

The present invention addresses a need in the art by providing a method comprising the steps of a) contacting under emulsion polymerization conditions at a temperature in the range of from 30° C. to 55° C., and at a pH in the range of from 6.0 to 9.0: 1) 75 to 98.5 parts by weight vinyl acetate; 2) 1 to 20 parts by weight of a cyclic ketene acetal monomer; and 3) 0.05 to 5 parts by weight of a monoethylenically unsaturated acid monomer or a salt thereof; to form an aqueous dispersion of copolymer particles comprising structural units of vinyl acetate, the cyclic ketene acetal, and the monoethylenically unsaturated acid monomer or a salt thereof; wherein the cyclic ketene acetal monomer is characterized by following structure:

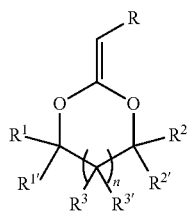

where n is 0, 1, or 2;
R is H or $C_1$-$C_6$-alkyl;
$R^1$ and $R^2$ are each independently H, $C_1$-$C_{12}$-alkyl, phenyl, or vinyl; or $R^1$ and $R^2$ together with the carbon atoms to which they are attached, form a fused benzene ring or a fused $C_3$-$C_7$-cycloaliphatic ring; and
$R^{1'}$ and $R^{2'}$ is are each independently H or $C_1$-$C_{12}$-alkyl; or $R^1$ and $R^{1'}$ and/or $R^2$ and $R^{2'}$ form an exocyclic double bond;
with the proviso that when n is 1:
$R^3$ and $R^{3'}$ are each independently H, $C_1$-$C_{12}$-alkyl, phenyl, or $R^3$ and $R^{3'}$ form an exocyclic double bond or a spirocycloaliphatic group or spiro-2-methylene-1,3-dioxepane group;
with the further proviso that when n is 2:
each $R^3$ is H, $C_1$-$C_{12}$-alkyl, or together with the carbon atoms to which they are attached form a double bond, a fused benzene ring, or a fused $C_3$-$C_7$-cycloaliphatic ring.

The method of the present invention provides a waterborne dispersion that is substantially free of volatile organic solvents; the dispersion is useful, for example, in the manufacture of biodegradable packaging products.

DETAILED DESCRIPTION OF THE INVENTION

The present invention provides a method comprising the steps of a) contacting under emulsion polymerization conditions at a temperature in the range of from 30° C. to 55° C., and at a pH in the range of from 6.0 to 9.0: 1) 75 to 98.5 parts by weight vinyl acetate; 2) 1 to 20 parts by weight of a cyclic ketene acetal monomer; and 3) 0.05 to 5 parts by weight of a monoethylenically unsaturated acid monomer or a salt thereof; to form an aqueous dispersion of copolymer particles comprising structural units of vinyl acetate, the cyclic ketene acetal, and the monoethylenically unsaturated acid monomer or a salt thereof; wherein the cyclic ketene acetal monomer is characterized by following structure:

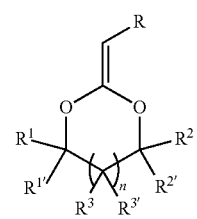

where n is 0, 1, or 2;
R is H or $C_1$-$C_6$-alkyl;
$R^1$ and $R^2$ are each independently H, $C_1$-$C_{12}$-alkyl, phenyl, or vinyl; or $R^1$ and $R^2$ together with the carbon atoms to which they are attached, form a fused benzene ring or a fused $C_3$-$C_7$-cycloaliphatic ring; and
$R^{1'}$ and $R^{2'}$ are each independently H or $C_1$-$C_{12}$-alkyl; or $R^1$ and $R^{1'}$ and/or $R^2$ and $R^{2'}$ form an exocyclic double bond;
with the proviso that when n is 1:
$R^3$ and $R^{3'}$ are each independently H, $C_1$-$C_{12}$-alkyl, phenyl, or $R^3$ and $R^{3'}$ form an exocyclic double bond or a spirocycloaliphatic group or spiro-2-methylene-1,3-dioxepane group;
with the further proviso that when n is 2:
each $R^3$ is H, $C_1$-$C_{12}$-alkyl, or together with the carbon atoms to which they are attached form a double bond, a fused benzene ring, or a fused $C_3$-$C_7$-cycloaliphatic ring.

As used herein, the term "structural unit of vinyl acetate" refers to a polymer backbone containing the following repeat units:

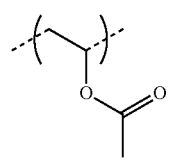

Structural unit of vinyl acetate wherein the dotted lines represent the points of attachment to the other structural units in the polymer backbone.

The term "structural unit of a cyclic ketene acetal monomer" is used to refer to a polymer backbone containing the following repeat unit:

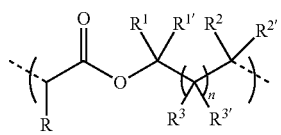

Structural unit of a cyclic ketene acetal monomer where R, $R^1$, $R^2$, $R^3$, $R^{1'}$, $R^{2'}$, $R^{3'}$, and n are as previously defined.

Examples of cyclic ketene acetal monomers include:

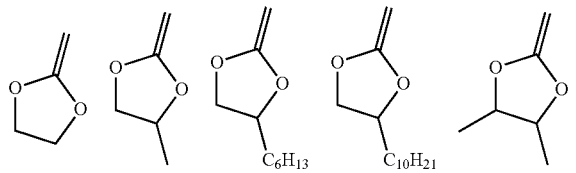

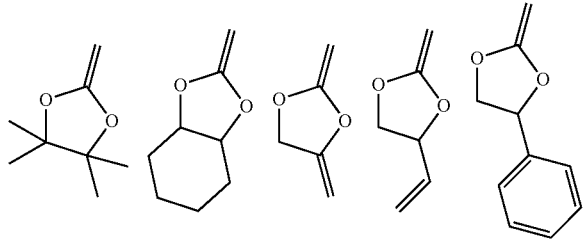

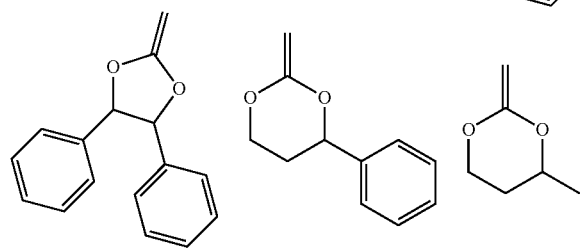

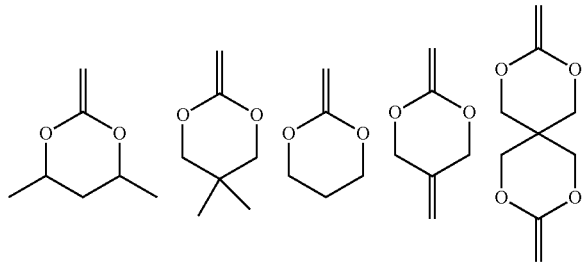

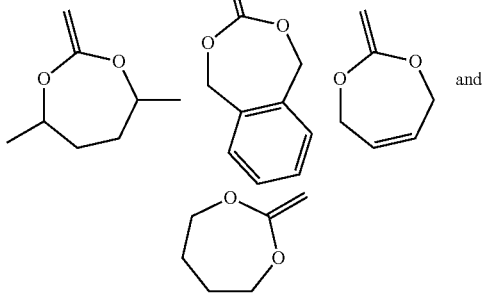

A preferred cyclic ketene acetal monomer is 2-methylene-1,3-dioxepane (MDO).

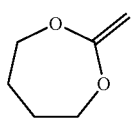

A structural unit of MDO is illustrated:

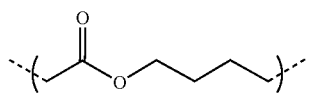

Structural unit of 2-methylene-1,3-dioxepane

The ethylenically unsaturated acid monomer can be a carboxylic acid containing monomer, a phosphorus acid containing monomer, or a sulfur acid containing monomer, or salts thereof. Examples of suitable carboxylic acid containing monomers include acrylic acid, methacrylic acid, itaconic acid, crotonic acid, maleic acid, and fumaric acid; examples of suitable phosphorus acid containing monomers include phosphoethyl methacrylate and 2-(methacryloyloxy)ethyl phosphonic acid; suitable sulfur acid containing monomers include 2-acrylamido-2-methyl-1-propanesulfonic acid (AMPS), vinyl sulfonic acid, 2-sulfoethyl acrylate, 2-sulfoethyl methacrylate, 3-sulfopropyl acrylate, 3-sulfopropyl methacrylate, and 2-propene-1-sulfonic acid. The ethylenically unsaturated acid monomer is preferably a sulfonic acid containing monomer, preferably the salt of a sulfonic acid containing monomer, with a salt of 2-acrylamido-2-methylpropane sulfonic acid being especially preferred.

Preferably, the polymer particles have a z-average particle size in the range of from 50 nm, more preferably from 80 nm, and most preferably from 100 nm; to preferably 500 nm, more preferably to 300 nm, more preferably to 200 nm, and most preferably to 150 nm.

Preferably, VA is used in an amount in the range of from 80, more preferably from 85 parts by weight, to 96.5, more preferably 95 parts by weight based on the weight of the VA, the CKA, and the ethylenically unsaturated acid monomer; preferably, the CKA is used in an amount in the range of from 3 parts by weight to 15, more preferably to 12 parts, and most preferably to 8 weight percent parts by weight based on the weight of the VA, the CKA, and the ethylenically unsaturated acid monomer; and preferably the monoethylenically unsaturated acid monomer is preferably used in an amount in the range of from 0.1 parts by weight to 3, more preferably to 1 part by weight based on the weight of the VA, the CKA, and the ethylenically unsaturated acid monomer.

The composition preferably comprises a substantial absence of hydrolysis byproducts of the CKA and VA. More particularly, where the CKA is MDO, the composition preferably comprises less than 20, more preferably less than 10, more preferably less than 5, more preferably less than 2, and most preferably less than 1 weight percent of the undesirable ester 4-hydroxybutyl acetate (illustrated below) based on the weight of structural units of MDO in the polymer particles.

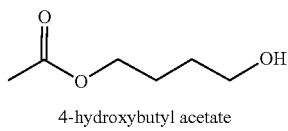

4-hydroxybutyl acetate

The composition preferably further comprises less than 3000 ppm, more preferably less than 2000 ppm of acetic acid, which is an undesired byproduct of VA hydrolysis.

In a preferred process of the present invention, VA, the CKA, preferably MDO, and the monoethylenically unsaturated acid monomer, preferably a salt of a sulfur acid containing monomer, more preferably a salt of AMPS, are contacted together under emulsion polymerization conditions. Preferably, the VA and the CKA are combined together, then mixed with an aqueous solution of surfactant and the monoethylenically unsaturated acid monomer under emulsion polymerization conditions. The reaction is controlled at a temperature in the range of from 30° C., preferably from 35° C., to 55° C., preferably to 50° C., and more preferably to 45° C., and at a pH in the range of from 6.0, preferably from 6.5, more preferably from 7.0, and most preferably from 7.5, to 9.0, more preferably to 8.5. After completion of the polymerization, a dispersion of the copolymer having a solids content preferably in the range of from 20, more preferably from 25, and most preferably from 30 weight percent, to 50, and more preferably to 40 weight percent, is obtained.

It has surprisingly been discovered that aqueous dispersions of copolymers of VA and CKA can be prepared efficiently without the use of organic solvents and with a minimum of undesirable hydrolysis byproducts of the CKA and VA.

Method for Measuring Particle Size

Particle size was measured using a Malvern Zetasizer Nano ZS90, which measures Z-average particle size ($D_z$) using dynamic light scattering (DLS) at a scattering angle of 90° using Zetasizer software version 7.11. A drop of the sample dispersion was diluted using an aqueous solution of MilliQ water (18.2 MΩ.cm at 25° C.) to achieve a particle count in the range of 200-400 thousand counts/s (Kcps). Particle size measurements were carried using instrument's particle sizing method and $D_z$ was computed by the software. $D_z$ is also known as the intensity-based harmonic mean average particle size and expressed as;

$$D_z = \frac{\Sigma S_i}{\Sigma(S_i/D_i)}$$

Here, $S_i$ is scattered intensity from particle i with diameter $D_i$. Detailed $D_z$ calculations are described in ISO 22412:2017 (Particle size analysis—Dynamic light scattering (DLS)).

Acetic Acid Determination Method

Analysis of acetic acid was performed using a Agilent 1100 Series high-performance liquid chromatography system equipped with a Phenomenex Rezex ROA-Organic Acid H+(8%) (250×4.6) mm column (part number 00G-0138-E0), Phenomenex Security Guard Carbo-H4 element, UV detector operating at a wavelength of 210 nm, and autosampler. The column oven temperature was set to 35° C. and the mobile phase was 2.5 mM phosphoric acid in MilliQ water. The instrument operated at a flow rate of 0.4 mL/min (isocratic) and the sample injection volume was 5 μL. Data acquisition and analysis was performed using Agilent ChemStation software (version B.04.03). Samples were prepared for analysis by dilution in MilliQ water (1:100), followed by agitation on horizontal reciprocal shaker for 10 min. Samples were centrifuged at 100 000 rpm for 10 min at 25° C., and the supernatant was filtered through a 0.45 μm disposable syringe filter for injection.

Example 1—Preparation of an Aqueous Dispersion of VA/MDO Polymer Particles

A monomer mixture was prepared in a vessel by combining vinyl acetate (VA, 205.95 g), and 2-methylene-1,3-dioxepane (MDO, 10.88 g). Separately, an aqueous mixture was prepared in a vessel by combining deionized water (46.18 g), 2-acrylamido-2-methyl-1-propanesulfonic acid sodium salt (AMPS salt, 1.40 g, 50% active in water), Tergitol-15-S-40 secondary alcohol ethoxylate (15-S-40, 1.51 g, 70% active in water) and Disponil® FES-32, sodium lauryl ether sulfonate (FES-32, 6.15 g, 31% active in water). Separately, deionized water (285.0 g) was added to a 4-neck 1-L round bottom reactor fitted with an overhead stirrer, a condenser, and thermocouple. The reactor was heated to 40° C., after which time FES-32 (16.4 g, 31% active in water), AMPS salt (3.95 g, 50% active in water), $FeSO_4 \cdot 7H_2O$ (16.2 g, 0.15 active in water), and ethylenediamine tetraacetic acid (EDTA, 3.45 g, 1.0 wt % in water) were added to the reactor with the aid of additional deionized water (51.6 g). The monomer mixture and the aqueous mixture were fed concurrently into the reactor over 60 min while maintaining the reactor temperature at 40° C. Concurrently, separately prepared solutions of ammonium persulfate/t-butyl hydroperoxide (1.38 g APS and 0.58 g t-BHP in 37.0 g water) and Bruggolite FF6 (2.62 g in 37.6 g water) were fed into the reactor over 70 min. The reaction was measured to be pH=6.5-7 throughout the feed process. Upon completion of addition of the feeds, the reactor temperature was maintained at 40° C. for 15 min, and then cooled to 30° C. The resultant dispersion was adjusted to pH=7 with the addition of ammonium hydroxide (28% active in water) and was filtered through a 38-μm screen. The filtrate was analyzed for percent solids (32.9%) and the z-average particle size was determined to be 116 nm, as measured using dynamic light scattering (DLS). The incorporation of 2-methylene-1,3-dioxepane (MDO) was measured to be (84.3±4.3)% by diffusion-edited $^1H$ NMR spectroscopy. An error of 5% was assumed in all integrations values and propagated through the calculation for the incorporation of MDO.

Example 2

Example 1 was repeated, but the reaction was maintained at pH=8 throughout the feeds by the dropwise addition of ammonium hydroxide (28% active in water). The filtrate was analyzed for percent solids (31.3%) and the z-average particle size was determined to be 122 nm, as measured DLS. The incorporation of MDO was measured to be virtually quantitative (~100%) by diffusion-edited $^1$H NMR spectroscopy.

Example 3

Example 2 was repeated, but the monomer mixture was prepared by combining VA (183.95 g), and MDO (32.88 g). The filtrate was analyzed for percent solids (29.7%) and the z-average particle size was determined to be 92 nm, as measured DLS. The incorporation of MDO was measured to be 97.8±6.6% by diffusion-edited $^1$H NMR spectroscopy.

Comparative Example 1

Example 1 was repeated, but the reaction temperature was maintained at 60° C. throughout the feeds. The filtrate was analyzed for percent solids (29.8%) and the z-average particle size was determined to be 177 nm, as measured DLS. The incorporation of MDO was measured to be 55.1±3.9% by diffusion-edited $^1$H NMR spectroscopy.

Comparative Example 2

Example 1 was repeated, but the reaction temperature was maintained at 80° C. throughout the feeds. The filtrate was analyzed for percent solids (29.4%) and the z-average particle size was determined to be 217 nm, as measured DLS. The incorporation of MDO was measured to be 37.8±2.7% by diffusion-edited $^1$H NMR spectroscopy.

Comparative Example 3

Example 1 was repeated, except that the reaction was maintained at pH=5 throughout the feeds by the dropwise addition of acetic acid (10% active in water). The filtrate was analyzed for percent solids (31.0%) and the z-average particle size was determined to be 248 nm, as measured DLS. The incorporation of MDO was measured to be 29.0±2.0% by diffusion-edited $^1$H NMR spectroscopy.

Comparative Example 4

Example 1 was repeated, but the reaction was maintained at pH=9.5 throughout the feeds by the dropwise addition of ammonium hydroxide (28% active in water). The filtrate was analyzed for percent solids (29.6%) and the z-average particle size was determined to be 283 nm, as measured DLS. The incorporation of MDO was measured to be 90.3±6.3% by diffusion-edited $^1$H NMR spectroscopy; nevertheless, the sample displayed poor colloidal stability and 7850 ppm of gel was obtained. The sample discolored upon standing to a dark brown and an unusually high concentration of acetic acid and acetaldehyde was observed.

The examples demonstrate the significance of the role that temperature and pH play in optimizing the incorporation of the water-sensitive monomers into the polymer backbone and in reducing the production of unwanted hydrolysis products arising from these monomers.

The invention claimed is:

1. A method for preparing an aqueous dispersion of vinyl acetate-cyclic ketene acetal copolymer particles comprising the steps of:

a) contacting under emulsion polymerization conditions at a temperature in the range of from 30° C. to 55° C., and at a pH in the range of from 6.0 to 9.0:
1) 75 to 98.5 parts by weight of vinyl acetate;
2) 1 to 20 parts by weight of a cyclic ketene acetal monomer; and
3) 0.05 to 5 parts by weight of a monoethylenically unsaturated acid monomer or a salt thereof; to form an aqueous dispersion of copolymer particles comprising structural units of vinyl acetate, the cyclic ketene acetal, and the monoethylenically unsaturated acid monomer or a salt thereof;

wherein the cyclic ketene acetal monomer is the following structure:

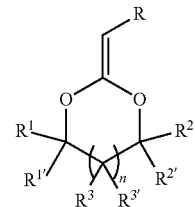

where n is 0, 1, or 2;

R is H or $C_1$-$C_6$-alkyl;

$R^1$ and $R^2$ are each independently H, $C_1$-$C_{12}$-alkyl, phenyl, or vinyl; or $R^1$ and $R^2$ together with the carbon atoms to which they are attached, form a fused benzene ring or a fused $C_3$-$C_7$ cycloaliphatic ring; and $R^{1'}$ and $R^{2'}$ are each independently H or $C_1$-$C_{12}$-alkyl; or $R^1$ and $R^{1'}$ and/or $R^2$ and $R^{2'}$ form an exocyclic double bond;

with the proviso that when n is 1:

$R^3$ and $R^{3'}$ are each independently H, $C_1$-$C_{12}$-alkyl, phenyl, or $R^3$ and $R^{3'}$ form an exocyclic double bond or a spirocycloaliphatic group or spiro-2-methylene-1,3-dioxepane group;

with the proviso that when n is 2:

each $R^3$ is H, $C_1$-$C_2$-alkyl, or together with the carbon atoms to which they are attached form a double bond, a fused benzene ring, or a fused $C_3$-$C_7$-cycloaliphatic ring.

2. The method of claim 1 wherein the cyclic ketene acetal monomer, the vinyl acetate, and the monoethylenically unsaturated acid monomer or a salt thereof are contacted under emulsion polymerization conditions at a temperature in the range of from 35° C. to 55° C., and at a pH in the range of from 6.5 to 8.5.

3. The method of claim 2 wherein cyclic ketene acetal monomer is selected from the group consisting of:

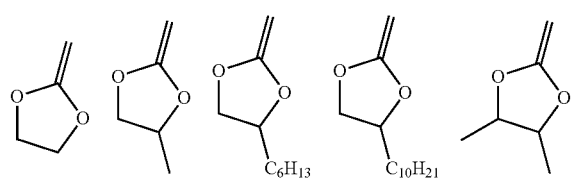

-continued

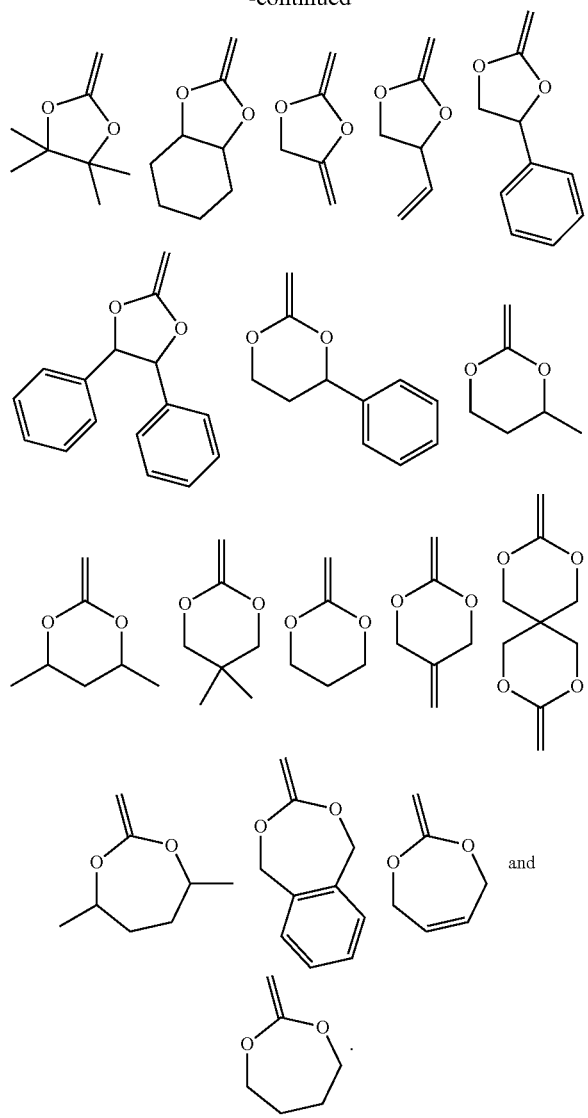

4. The method of claim 3 wherein the cyclic ketene acetal monomer is 2-methylene-1,3-dioxepane, and the monoethylenically unsaturated acid monomer is a sulfur acid containing monomer or a salt thereof; wherein the 2-methylene-1,3-dioxepane, the vinyl acetate, and the sulfur acid containing monomer or a salt thereof are contacted under emulsion polymerization conditions at a temperature in the range of from 35° C. to 50° C. and at a pH in the range of from 7.5 to 8.5; wherein the aqueous dispersion of polymer particles comprises structural units of vinyl acetate and 2-methylene-1,3-dioxepane.

5. The method of claim 4 wherein the sulfur acid containing monomer or salt thereof is selected from the group consisting of 2-acrylamido-2-methyl-1-propanesulfonic acid, salts of 2-acrylamido-2-methyl-1-propanesulfonic acid, vinyl sulfonic acid, salts of vinyl sulfonic acid, 2-sulfoethyl acrylate, 2-sulfoethyl methacrylate, 3-sulfopropyl acrylate, 3-sulfopropyl methacrylate, sodium styrene sulfonate, 2-propene-1-sulfonic acid and salts of 2-propene-1-sulfonic acid.

6. The method of claim 5 wherein the sulfur acid containing monomer or salt thereof is a salt of 2-acrylamido-2-methyl-1-propanesulfonic acid.

7. The method of claim 6 wherein the aqueous dispersion of polymer particles further comprises less than 20 weight percent 4-hydroxybutyl acetate based on the weight of structural units of 2-methylene-1,3-dioxepane in the polymer particles; wherein the 2-methylene-1,3-dioxepane, the vinyl acetate, and the sulfur acid containing monomer or a salt thereof are contacted under emulsion polymerization conditions at a temperature in the range of from 35° C. to 45° C.

8. The method of claim 4 wherein the aqueous dispersion of polymer particles further comprises less than 10 weight percent 4-hydroxybutyl acetate based on the weight of structural units of 2-methylene-1,3-dioxepane in the polymer particles.

9. The method of claim 5 wherein the aqueous dispersion of polymer particles further comprises less than 2 weight percent 4-hydroxybutyl acetate based on the weight of structural units of 2-methylene-1,3-dioxepane in the polymer particles.

10. The method of claim 7 wherein the aqueous dispersion of polymer particles further comprises less than 1 weight percent 4-hydroxybutyl acetate based on the weight of structural units of 2-methylene-1,3-dioxepane in the polymer particles.

* * * * *